April 3, 1934.   M. B. A. SCHIER   1,953,437
AUDITORY INSERT
Filed Nov. 5, 1932   4 Sheets-Sheet 1

INVENTOR.
Mayer B. A. Schier
BY
J. Kaplan
ATTORNEY.

April 3, 1934.  M. B. A. SCHIER  1,953,437
AUDITORY INSERT
Filed Nov. 5, 1932  4 Sheets-Sheet 2

INVENTOR.
Mayer B. A. Schier
BY
J. Kaplan
ATTORNEY.

April 3, 1934. M. B. A. SCHIER 1,953,437
AUDITORY INSERT
Filed Nov. 5, 1932 4 Sheets-Sheet 3

INVENTOR.
Mayer B. A. Schier
BY
J. Kaplan
ATTORNEY.

April 3, 1934.　　　M. B. A. SCHIER　　　1,953,437
AUDITORY INSERT
Filed Nov. 5, 1932　　　4 Sheets-Sheet 4
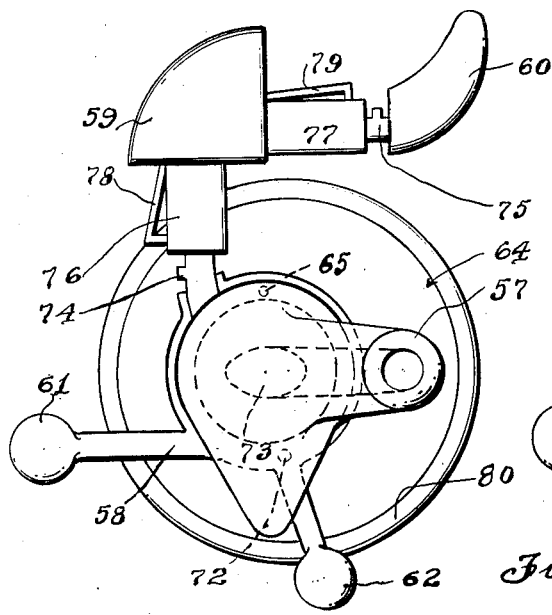
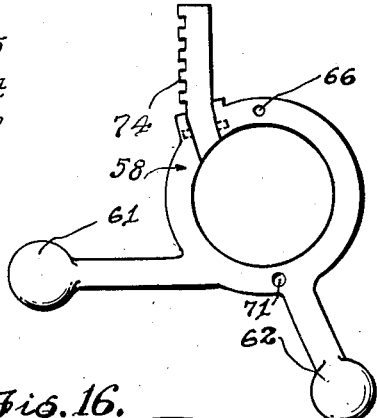
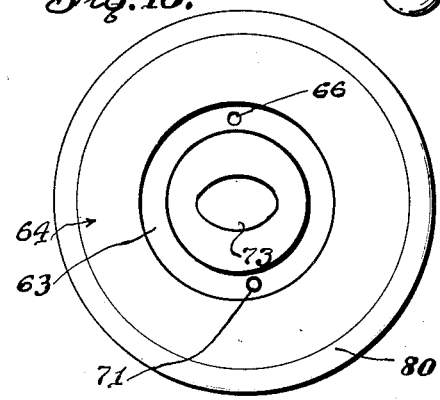
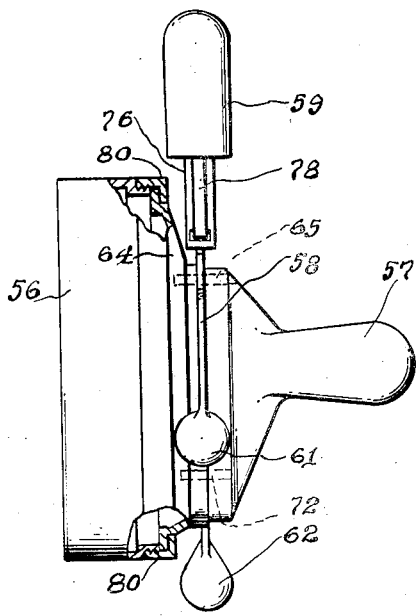
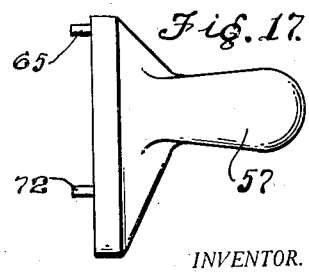
INVENTOR.
Mayer B. A. Schier
BY
J. Kaplan
ATTORNEY.

Patented Apr. 3, 1934

1,953,437

UNITED STATES PATENT OFFICE 1,953,437

AUDITORY INSERT

Mayer B. A. Schier, New York, N. Y.

Application November 5, 1932, Serial No. 641,413

18 Claims. (Cl. 181—23)

This invention relates to ear receivers requiring ear attachments and more particularly to an auditory insert which fits in the ear and functions as a support for the receiver and is an improvement of my Patent #1,852,130 granted April 5, 1932.

The principal object of the invention is to provide a device for holding hearing receivers comfortably and efficiently in the ear without the aid of wires, loops, or other devices.

Still another object of the invention is to provide an insert having points of contact with the ear and means to regulate the points of contact so as to fit in maximum number of sizes of ears, and permitting variation of dimensional relationship.

Still another object of the invention is to provide an insert having points of contact with the ear and means to shift the points of contact so as to fit the right and left ears.

Another object of the invention is to provide an insert that will permit a variation of dimensional relationship and having means to fit both right and left ears.

Another object of the invention is to provide adjunct auxiliary arms, which with a modification of receiver for its reception, will act as an insert in any of the foregoing possible variations.

Still a further object of the invention is to provide an insert which is light in weight, small in bulk and which will not fill up the entire cavity of the ear and can securely be held in place.

Still another object of the invention is to provide an insert which is self ventilating and which will not accumulate heat.

Other objects of the invention will appear as the disclosure progresses. The drawings are intended to merely indicate a possible embodiment of the invention. It is possible that the actual needs of manufacture may necessitate certain mechanical changes. It is therefore not intended to limit the invention to the embodiment illustrated but rather to define such in the appended claims.

For a more general understanding of the invention attention is called to the drawings. In these drawings like reference characters denote like parts throughout the specification.

In the drawings:

Figure 13 is a front view of another modification of the device.

Figure 14 is a side view thereof.

Figure 15 is a detail view of the support for the contact element.

Figure 16 is a detached view of the earphone.

Figure 17 is a detached view of the earpiece.

Figure 1:
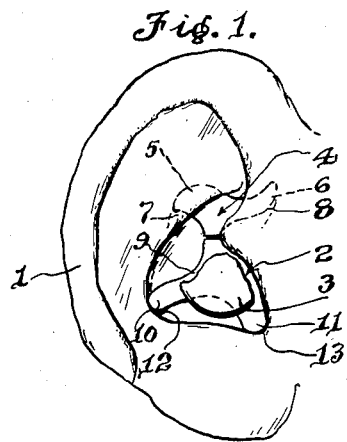
Figure 1 is a view looking directly at an external right ear showing the earphone support in position.

Referring now to the drawings numeral 1 represents the right ear, 2 the body member of the device and 3 the earphone. The body member comprises an upper element 4 having contacting points 5 and 6 which contact with the crura of antihelix 7 and the crus of the helix 8 of the ears respectively, and a bottom element 9 having two contacting points 10 and 11 which engage the cavum conchæ 12 and the incisura intertragica 13 of the ear. The bottom element 9 is provided with a central hole 14 and fitting into the periphery of said hole are two resilient and split metallic rings 15.

Figure 3:
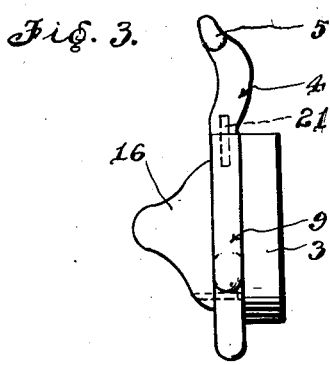
Figure 3 is a side view of the device shown in Figure 1.

Numeral 16 designates the eartip provided at the inner end with a sleeve 17 and having a groove 18 in the face thereof. A similar sleeve 19 having a groove 20 is attached to the inner end of the earphone 3. The purpose of this arrangement is to lock the earpiece and the earphone to the element 9. Now when the said sleeves are forced into the hole 14 the resilient rings 15 will lock the earpiece and earphone to the element 9 as shown in Figure 3.

Figure 2:
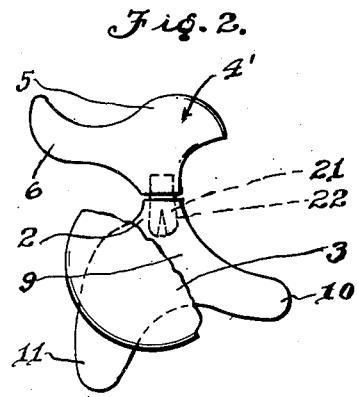
Figure 2 is an enlarged view of the earphone support arranged to fit the left ear.
Figure 6:
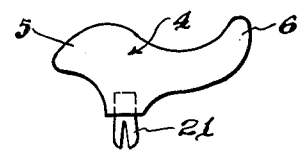
Figure 6 is a detached view of one of the upper contacting members adapted to fit the device when used in the right ear.

The upper element 4 is removably supported and has attached to the bottom a spring clamp 21 which fits into a slot 22 at the top of the element 9. Figure 1 of the drawings shows the device attached to the right ear. When it is desired to insert the device in the left ear the upper element 4 shown in Figures 1 and 6 is removed and another element 4' is inserted in its place as shown in Figure 2. Thus one single device with the exception of elements 4 and 4' can be made to serve both the left and right ear. Numeral 16' represents a pin attached to the earpiece and which passes into the element 9 and prevents the earpiece from rotating in relation to the said element. This detail is clearly seen in Figure 4.

Figure 7:
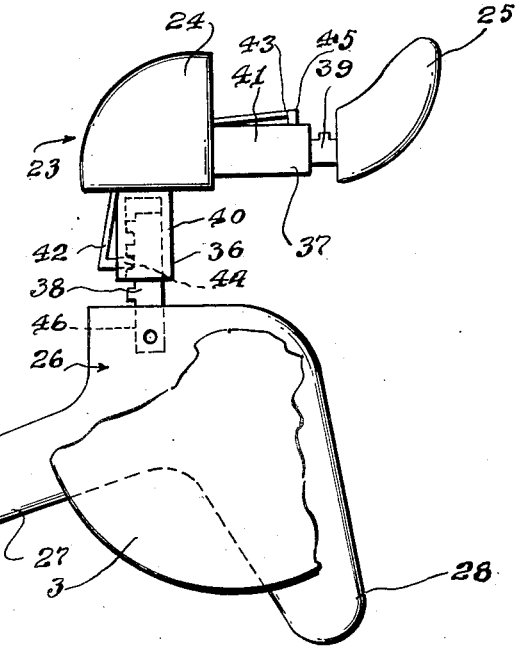
Figure 7 is a front view of a modified form of the invention for fitting into the right ear.

In the modification shown in Figure 7 numeral 23 designates the upper element having points of contact 24 and 25 which contact with the crura of antihelix 7 and the crus of the helix 8 of the ear respectively and a bottom element 26 having contacting points 27 and 28 which engage against the outer limit of the cavum conchæ 12 and medial of incisura intertragica 13 medial of the ear. The bottom element is provided with a central hole 29 and fitting into the periphery of said hole is a plurality of resilient split metallic rings 30.

Figure 4:
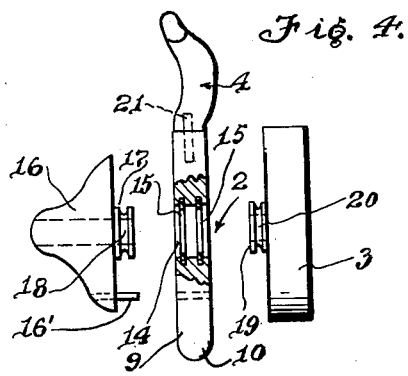
Figure 4 is a detached view of the various parts of the device.
Figure 5:
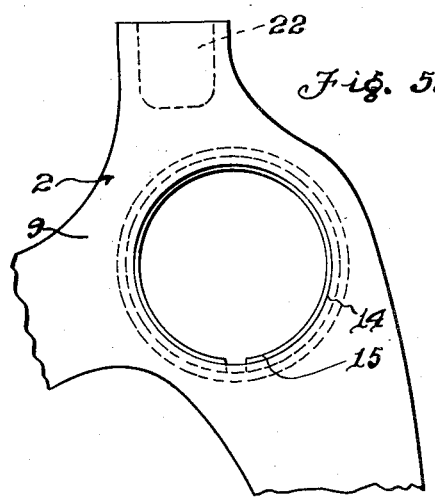
Figure 5 is an enlarged fragmentary view of the body portion or support.

Numeral 31 designates the earpiece provided at the inner end with a sleeve 32 having grooves 33 in the face thereof. A similar sleeve 34 having grooves 35 is attached to the inner end of the earphone 3. The purpose of this arrangement as in Figure 4 is to lock the parts of the device together.

Means are provided to raise or lower the contact 24 in relation to the element 26 and to extend or reduce the position of the contact 25 in relation to the contact 24 so as to fit different size ears. Said means comprise telescopic members 36 and 37 consisting of ratchets 38 and 39 which slide in and out the sleeve 40 and 41. The ratchets 38 and 39 are attached to the contact element 25 and the lower element 26 respectively, while the sleeves 40 and 41 are embedded in the contact element 24. On the exterior of each of the sleeves are spring catches 42 and 43 which engage with the teeth of the ratchets and lock the telescopic mechanism in position. To move the co-operating telescopic members the fingers 44 and 45 are pulled out of the ratchets and the sleeves shifted to suit the conditions of size of the ear.

Figure 8:
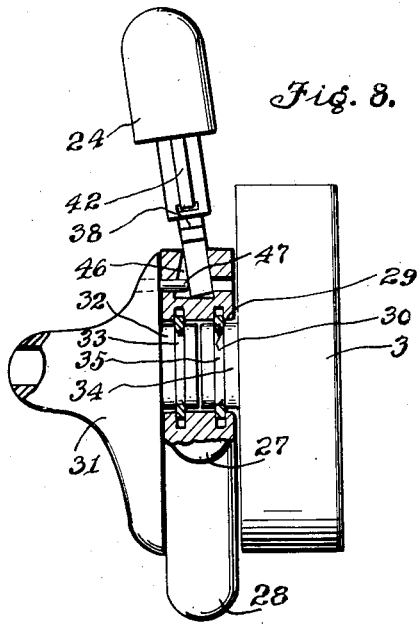
Figure 8 is a side view thereof.

This form of the device is also adapted to fit both left and right ears. As shown in Figures 7 and 8 the device is set to fit the right ear. Now when it is desired to fit the left ear, the earphone 3 and eartips 31 are interchanged as shown in Figure 9 and with the contact element 25 still pointing to the right or anteriorly.

Figure 9:
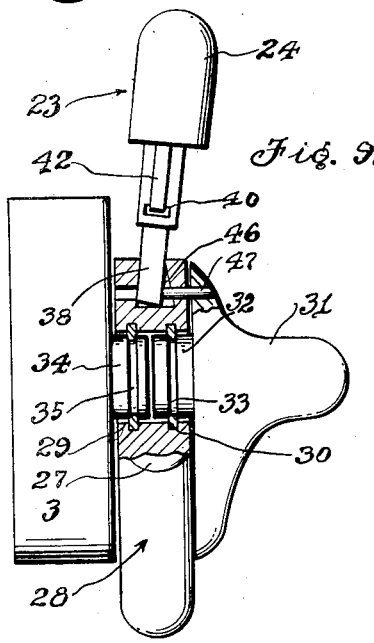
Figure 9 is a similar view as Figure 8 but showing the upper contacting element in a different position adapted to fit the left ear.

The walls of the recess 46 taper outwardly towards the bottom so when the earpiece 31 is attached at either side of the member 26, the pin 47 which is permanently attached to the earpiece will force the lower end of the ratchet against the sloping wall and thus correctly and automatically position the structure as shown in Figures 8 and 9. It will thus be seen that this form of the invention is also adapted to fit both left and right and various size ears.

Figure 10:
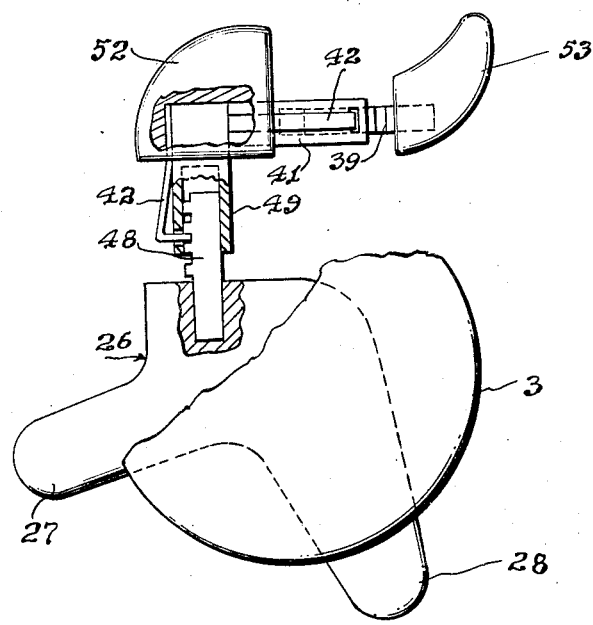
Figure 10 is a front view of another modification of the invention adapted to fit the right ear.
Figure 12:
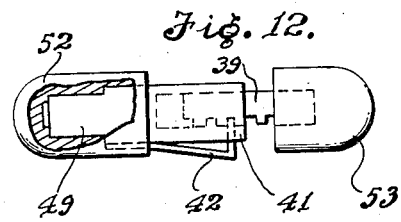
Figure 12 is a top view of the device.
Figure 11:
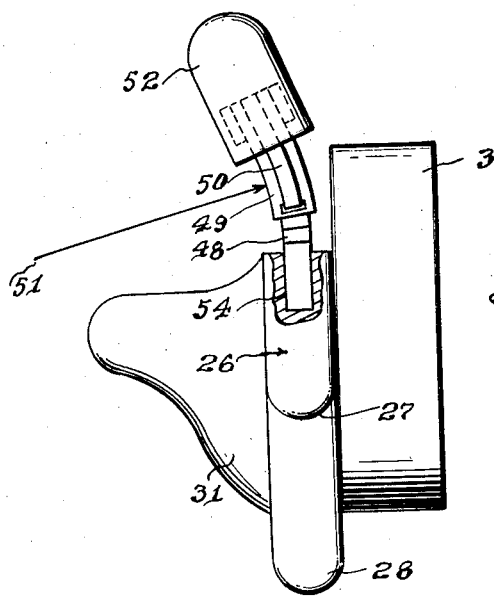
Figure 11 is a side view thereof.

The form of the invention shown in Figures 10 to 12 is substantially the same as that shown in Figures 7 to 9 inclusive with the exception that the ratchet 48, sleeve 49 and spring 50 are disposed on an arc with the radii 51 beyond and above the outer extremity of the earpiece 31. With the structure bent in this particular fashion a proper fit can be had with ears at the contact elements 52 and 53. The bottom of the ratchet 48 is straight and fits into a straight hole 54.

In the form of the invention shown in Figures 13 to 17, numeral 56 represents the earphone, 57 the eartip and 58 a support for the contact elements 59, 60, 61 and 62. The support 38 fits into a recess 63 formed into the front part 64 of the earphone and is held in place against movement by the pins 65 and 72 which are attached to the eartip and which pass into the holes 66 and 71 of the part 64. Numeral 73 designates an opening in the part 64 of the earphone which registers with the usual opening of the eartip 57. Numerals 74 and 75 designate the ratchets which slidably fit into the sleeves 76 and 77, and 78 and 79 the springs for locking the ratchets and sleeves together. The earphone 56 is attached to the part 64 by the aid of a swivel or rotary joint 80 as shown in Figure 14 or may be locked and fixed permanently in place. Thus the ear contacting end of the device can be swivelled or turned in relation to the earphone to obtain the best results of the instrument adaptation to ear.

It will thus be seen that I have provided an insert having means to regulate the points of contact so as to fit practically all ears and means to shift certain points of contact to fit both right and left ears. The various parts of the device can easily and simply be interchanged and made to fit the ear by the user himself.

Having described my invention, I claim:

1. In an insert for an ear comprising a body member and a series of radiating arms adapted to contact with the ear, and means to regulate some of said arms in relation to said body member and with ear.

2. In an insert of the class described, a body member, an eartip attached to one side of said body member, an earphone attached to the other side of said body, and means to transpose the position of said eartip and earphone in relation to each other.

3. An insert of the class described, a body member, an earphone removably attached to one side of said body member, an eartip removably attached to the other side of said body member, and means to interchange the positions of said earphone and eartip in relation to each other.

4. In an insert of the class described, a body member, an eartip attached to one side of said body member, an earphone attached to the other side of said body, and means to transpose the position of said eartip and earphone in relation to each other, a series of radiating arms associated with said body member, and means to regulate some of said arms in relation to said body member and with ear.

5. An insert of the class described, a body member, an earphone removably attached to one side of said body member, an eartip removably attached to the other side of said body member, and means to interchange the positions of said earphone and eartip in relation to each other, a series of radiating arms associated with said body member, and means to regulate some of said arms in relation to said body member and with ear.

6. In an insert of the class described, a body member, a set of radiating arms associated with said body member, an upper contacting element removably attached to said body member, and means to reset said upper contacting element in relation to said body member for different ear sizes.

7. In an insert of the class described, a body member, a set of radiating arms associated with said body member, an upper contacting element removably attached to said body member, and means to reset said upper contacting element in relation to said body member, for different ear sizes, an earphone attached to one side of said body member, an eartip attached to the other side of said body member, and means to interchange the position of said eartip and earphone.

8. In an insert of the class described, a body member arranged to contact with the inside of an ear, and means to regulate the size of said body member to fit a variety of size ears.

9. In an insert of the class described, a body member, a set of radiating arms associated with said body member, an upper contacting element removably attached to said body member, and means to reset said upper contacting element in relation to said body member for different ear sizes, an earphone removably attached to one side of said body member, an eartip removably attached to the other side of said body member, and means to latch said earphone and eartip in place.

10. In a device of the class described, a body member, a series of radiating arms leading from said body member, an upper contacting element removably attached to said body member, an earphone on one side of said body member, an eartip on the other side of said body member, sleeves at the inner faces of said earphone and earpiece, said sleeves adapted to fit in an opening in said body member.

11. In a device of the class described, a body member, arms radiating from said body member, an assembly of two upper ear contacting elements removably supported by said body member, means to regulate the position of said assembly of contacting elements in relation to said body member, and means to regulate the position of said two upper contacting elements in relation to each other.

12. In a device of the class described, a body member, arms radiating from said body member, an assembly of two upper ear contacting elements, means to regulate the position of said assembly of contacting elements in relation to said body member, said means comprising a ratchet supported in said body member, said ratchet fitting into a sleeve embedded in one of said assembly of ear contacting elements, and means to lock said ratchet and sleeve together.

13. In a device of the class described, a body member, arms radiating from said body member, an assembly of two upper ear contacting elements, means to regulate the position of said assembly of contacting elements in relation to said body member, said means comprising a ratchet supported in said body member, said ratchet fitting into a sleeve embedded in one of said assembly of ear contacting elements, and means to lock said ratchet and sleeve together, another sleeve protruding from one of said assembly of contacting elements, a ratchet slidably fitting into said last mentioned sleeve, the other one of said upper ear contacting elements attached to said ratchet, and means to lock the last mentioned ratchet and sleeve together.

14. In a device of the class described, a body member provided with a slot, an earphone and eartip removably attached to opposite sides of said body member, an upper assembly of ear contacting elements supported by a stem, said stem held at an angle in said slot in said body member, said slot having walls tapering outwardly towards the bottom, a pin attached to said eartip and adapted to engage with said stem, and means including said stem for changing the angular position of said stem.

15. In a device of the class describd, a body member, an earphone and eartip removably attached to opposite sides of said body member, an upper assembly of ear contacting elements, a stem at the lower end of said assembly, said stem supported in said body member, and means to change the angular position of said assembly by reversing the position of said earphone and earpiece.

16. In a device of the class described, a support provided with a series of ear contacting elements, said support removably held in place, an eartip, an earphone, and means in said eartip to hold said support in place against said earphone.

17. In a device of the class described, an earphone, a disk-like supporting element for supporting said earphone, a support provided with a series of ear contacting elements and removably held in place in said disk-like supporting element, and means to swivel the said disk-like support and ear contacting element in relation to the earphone.

18. In a device of the class described, an earphone, a disk-like supporting element for supporting said earphone, a support provided with a series of ear contacting elements and removably held in place in grooves in said disk-like supporting element, an eartip, pins in said eartip to fasten said support against said disk-like supporting element, and means to swivel said ear contacting elements in relation to the earphone.

MAYER B. A. SCHIER.